United States Patent [19]

Fritch, Jr. et al.

[11] 3,805,538

[45] Apr. 23, 1974

[54] STEADY STATE FOOD FREEZING PROCESS

[75] Inventors: Carl Fowler Fritch, Jr., Glen Ellyn; Joseph A. Winoker, Tampa, both of Fla.

[73] Assignee: Chemetron Corporation, Chicago, Ill.

[22] Filed: July 13, 1972

[21] Appl. No.: 271,610

[52] U.S. Cl............................. 62/63, 62/65, 62/82, 99/193, 99/197
[51] Int. Cl............................................. F25d 13/06
[58] Field of Search .................. 62/62, 63, 65, 380; 99/193

[56] References Cited
UNITED STATES PATENTS

| | | |
|---|---|---|
| 3,250,630 | 5/1966 | Webster et al........................ 99/193 |
| 3,297,454 | 1/1967 | Webster et al........................ 99/193 |
| 3,413,818 | 12/1968 | Pelmulder.............................. 62/63 |
| 3,507,128 | 4/1970 | Murphy et al. ........................ 62/63 |
| 3,611,737 | 10/1971 | Alaburda et al........................ 62/63 |

Primary Examiner—Meyer Perlin
Assistant Examiner—Ronald C. Capossela
Attorney, Agent, or Firm—N. M. Esser

[57] ABSTRACT

The invention includes a process for freezing individual food segments, particularly sections or slices of an exudatory fruit while maintaining the integrity of the sac walls of such fruit, said invention employing a combination of a cryogenic coolant and a refrigerated gas coolant and achieving steady state operation by continuous defrosting of refrigeration coils by an antifreeze composition and removal of said antifreeze entrained in the gas coolant passing through the coils while providing for the free flow of said coolant.

6 Claims, 4 Drawing Figures

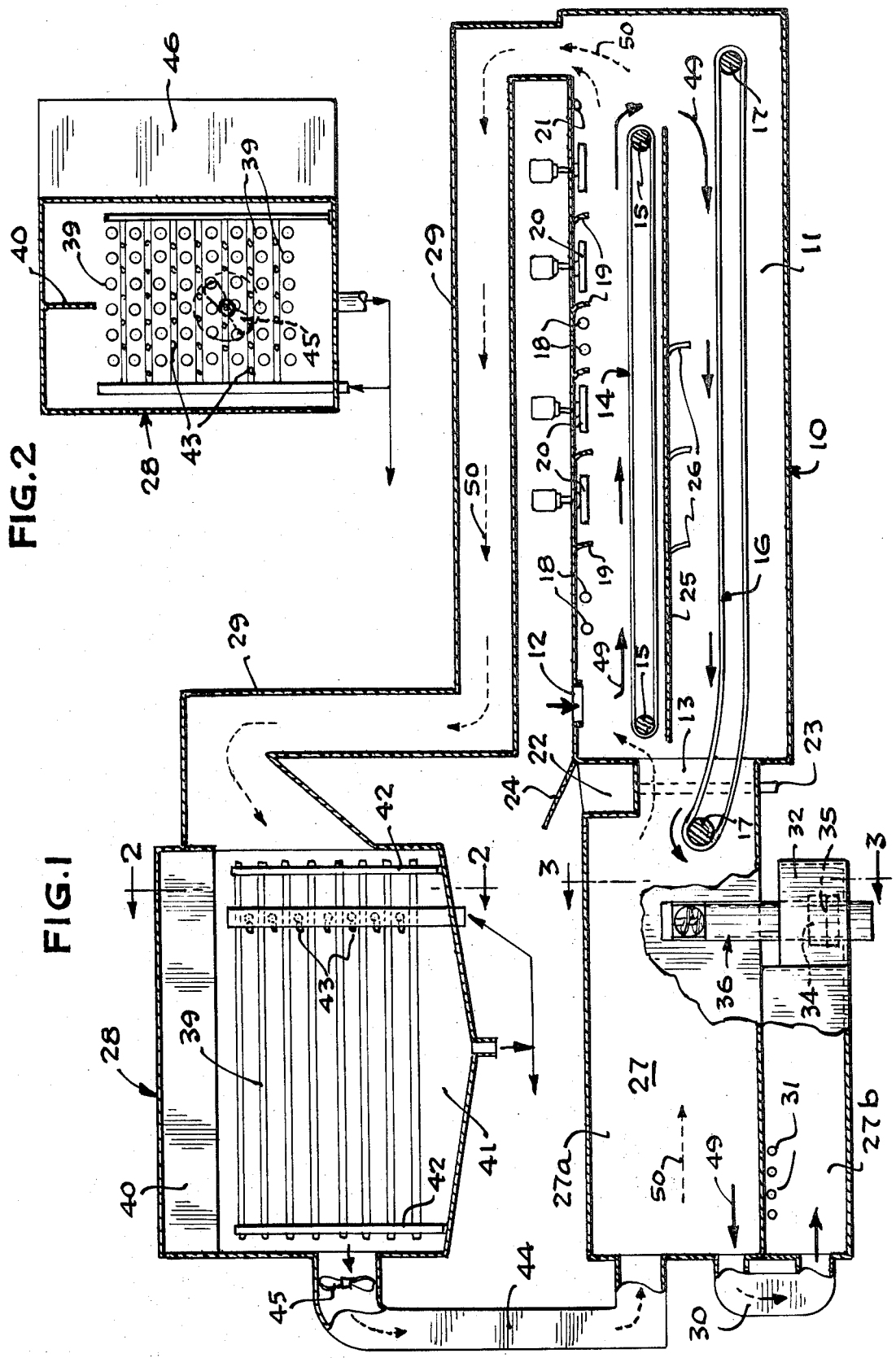

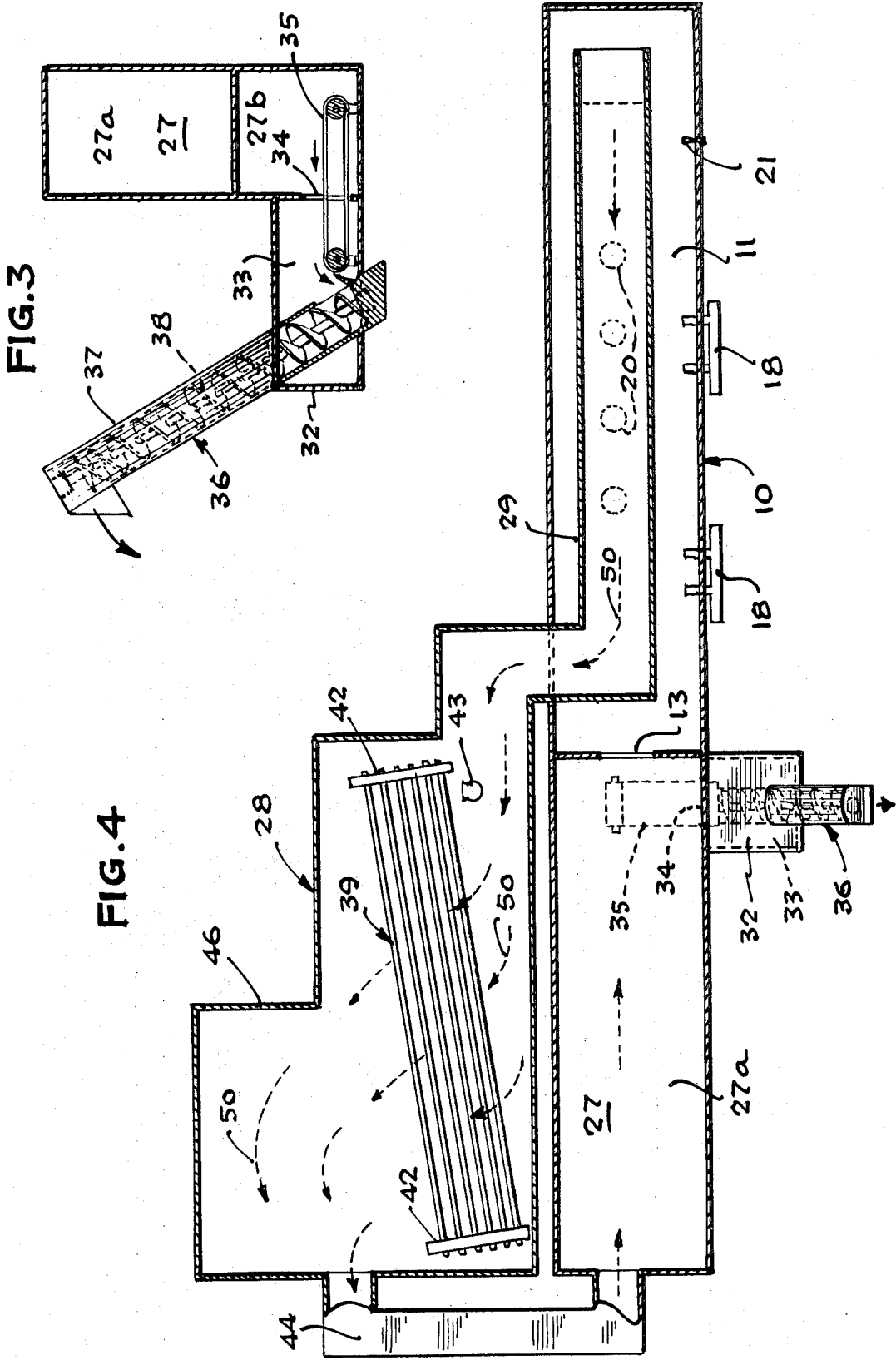

3,805,538

STEADY STATE FOOD FREEZING PROCESS

BACKGROUND OF THE INVENTION

The invention relates to a process for freezing individual food segments. In particular, it is related to freezing individual sections of exudatory or weeping fruit without damaging the sac walls of the fruit. More particularly, the invention relates to a steady-state process and apparatus having three stages of cooling, the first and third stages of which employ a cryogenic coolant and a second stage in which the food segments are subjected to a blast of refrigerated gas.

Traditionally, people living in areas where the winters were cold preserved foods by taking advantage of the freezing temperatures. Mechanical means of refrigeration have supplanted the cold weather process almost completely in this century but until the importance of quick freezing to produce small ice crystals within the cells of the food was recognized, the texture, taste and appearance of the frozen product was inferior to that of the fresh food. The formation of small ice crystals lessens the damage to the cell walls of the food caused by the piercing action of crystals grown large during a prolonged freezing period.

The freezing of exudatory fruits presents special problems. The cells of such fruits are properly called sacs. These sacs are quite large and are filled with juice which exudes easily. Examples of such fruits are the citrus fruits, watermelon, cantaloupe and other melons, pineapple and the like. For the convenience of consumers, the fruits are peeled and sectioned or sliced before being frozen. The sectioning of the fruit exposes the sacs and though quick freezing processes minimize the dehydration of the foods so frozen, the amount of water potentially lost to the cooling medium is quite large even at a percentage loss of less than 1 percent of the weight of water present. Moreover, the sections are quite fragile and are often damaged by the tumbling action encountered in the air blast and fluidized bed techniques of quick freezing.

Many previous attempts at freezing such fruits have resulted in a product which appears to the consumer as an unappetizing mush when thawed and production of individually quick frozen sections of exudatory fruit on a commercial scale was, for the most part, unsuccessful prior to the invention disclosed and claimed herein. A commercially viable process must be capable of steady state operation, one which may be continuously operated at an economically large throughput rate for at least a normal 8 hour working shift except for the occasional shutdowns for replacement of worn parts and the like.

Several means for individual quick freezing of food particles have been known. Each, however, suffers one or more disadvantages. The use of cryogenic freezing such as with liquid nitrogen as the sole cooling medium results in unnecessarily high freezing costs. Immersion of the fruit in a refrigerant such as brine or glycol introduces the risk of adulteration. Cooling of the refrigerant for such immersion to the temperature necessary to achieve sufficiently rapid freezing is also costly.

Air blast freezing is an important method of rapidly freezing foods. The air must be cooled to a sufficiently low temperature to cause fast formation of small ice crystals. Cooling of the air to such a temperature by mechanical refrigeration requires multiple stages of refrigeration, which are expensive. The invention described below overcomes this disadvantage by use of an economical combination of a cryogen and single stage refrigerated gas.

In order to achieve efficient cooling by the refrigerated gas it must be directed against the fruit at a high velocity but the fast moving gas stream causes a partial dehydration of the fruit. The water removed from the fruit enters the gas stream and as the gas passes through the free spaces defined by the refrigeration coil, the coil soon becomes coated with ice because of its extremely low temperature. Continuous defrosting of the coil is necessary to maintain efficient heat exchange in a commercially feasible steady state operation of a freezing apparatus and process.

U.S. Pat. No. 3,300,993 teaches the use of propylene glycol and brine as antifreeze compositions in the continuous defrosting of the refrigeration coil in an air blast freezing process. According to this patent the antifreeze is sprayed onto the coil transversely to the direction of the air stream passing through the coil. The patent does not mention the problem arising from the entrainment of the antifreeze in the air stream and the subsequent deposition of the antifreeze on the food being frozen. Such deposition on the food not only poses the possibility of premature partial thawing of the food but is also undesirable for esthetic reasons. Steady state operation was not achieved with an apparatus in which a filter was used to remove entrained antifreeze solution because of rapid clogging of the filter.

There remains, therefore, a need for an economical process to prepare individually frozen food segments which are substantially free of processing materials and are appetizing to the consumer.

An object of this invention, therefore, is to provide an apparatus for a steady state process of individually freezing food segments, the first stage of said freezing employing a cryogenic coolant to form a crust of ice within the surface cells thereof whereby dehydration of the food during the subsequent freezing process is prevented.

Another object of the invention is to provide a steady state apparatus and process for individually freezing exudatory fruit sections whereby mechanical strength is imparted to the fragile sections in a crusting stage so that the sections may withstand the abrasions of handling incidental to the subsequent freezing.

Another object of the invention is to provide a steady state apparatus and process for individually freezing fruit sections whereby the integrity of the juice sacs thereof is maintained.

Another object of the invention is to provide a steady state apparatus and process for individually freezing exudatory fruit sections wherein an economical one stage refrigeration unit is employed.

A further object is to provide a steady state apparatus and process for individually freezing exudatory fruit sections by a refrigerated gas blast wherein continuous defrosting of the refrigerant coil by wetting of the coil with an antifreeze composition may be achieved without contamination of the frozen fruit by said antifreeze.

A further object of the invention is the provision of an apparatus providing for free passage of the cooling gas while removing entrained antifreeze solution from the gas.

A still further object of the invention is the provision of a process and apparatus for crusting a food product while maintaining the integrity of the cell walls, freezing the crusted food with a gas blast and cooling the frozen product with a cryogenic refrigerant.

In accordance with these objects the invention described and claimed herein is a process for individually freezing exudatory fruit sections while maintaining the integrity of of the sac structure thereof comprising the steps of crusting the fruit sections, freezing the crusted sections and further cooling the frozen sections. In one embodiment of the process a cryogenic coolant is employed for the crusting and cooling steps and freezing is accomplished by a blast of refrigerated gas. Of the total heat removed about 20 percent is extracted in the crusting step, about 70 percent in the freezing step and about 10 percent in the cooling step. In a preferred embodiment of the invention, the gas is passed over a coil bathed with an antifreeze solution and the gas is moved at a low velocity downstream from the coil so that entrained antifreeze solution precipitates.

The gas may be nitrogen, carbon dioxide, air or the like and is preferably the vapor from a cryogen such as liquid nitrogen, liquid carbon dioxide and the like.

The apparatus of the invention, adapted for steady state operations, comprises means for conveying fruit sections through a crusting chamber, a freezing chamber and a cooling chamber, means for injecting a cryogen into said crusting chamber, means for circulating gas through said freezing chamber, a refrigeration coil to cool the gas, means for distributing a liquid antifreeze composition on said coil, means for moving the gas at a low velocity downstream from said coil whereby entrained antifreeze composition precipitates from the gas before the gas encounters said fruit sections in said freezing chamber, and means for injecting a cryogen into said cooling chamber. The coil may be cooled by a mechanically driven compressor, an absorption system or the like.

In one embodiment, the invention includes means for discharging product from the cooling chamber and obstructing the flow of cold, dense cryogen vapor from the cooling chamber, said means comprising a vapor lock which is inclined upwardly from the discharge port of the cooling chamber whereby the excess gas in the apparatus is forced to vent through the fresh fruit entrance port.

The invention and further objects and advantages thereof may best be understood by reference to the following description and the drawings, in which:

FIG. 1 is a semi-diagrammatic sectional view of an apparatus embodying the invention and shows the principal components thereof and the flow paths therebetween.

FIG. 2 is a sectional view of the apparatus taken along lines 2—2 of FIG. 1.

FIG. 3 is a sectional view of the apparatus taken along line 3—3 of FIG. 1.

FIG. 4 is a semi-diagrammatic plan view of the apparatus illustrated in FIG. 1.

As shown in FIG. 1, the apparatus includes a housing 10 enclosing crusting chamber 11 having a fresh fruit entrance port 12, and a crusted fruit exit port 13, an upper conveyor belt 14 frictionally engaged by cylindrical rollers 15, a lower conveyor belt 16 frictionally engaged by cylindrical rollers 17, each belt being driven by a conventional prime mover which is not shown. One or more jets 18, adapted for connection to a source of liquid nitrogen or other cryogen, one or more baffles 19 and blowers 20 are mounted on housing 10 above conveyor belt 14. One or more temperature sensors 21 are also mounted above conveyor belt 14. A recessed portion of housing 10 functions as a juice sump 22 having a drain 23 and a vibratable grating or shaker 24 is mounted over sump 22 in communication with entrance port 12. Belts 14 and 16 are separated by a framework 25 on which are mounted one or more baffles 26.

Crusting chamber 11 communicates with a two stage rotary food freezer 27 through exit port 13 and communicates with a coil housing 28 through a conduit 29. Rotary freezer 27 comprises two compartments, in each of which the food is conveyed by helical screws, the structure and advantages of which are described in U.S. Pat. No. 3,300,993 which is hereby incorporated by reference. The first compartment 27a and second compartment 27b of freezer 27 are connected by chute 30. Cryogen injectors 31 are mounted in the second compartment 27b near the discharge end of chute 30. Housing 32 defines a product transfer box 33 which is in communication with discharge port 34 of second compartment 27b. A product conveyor 35 is mounted partially within compartment 27b below port 34 and partially within transfer box 33. Mounted within transfer box 33 also is one end of a rotary conveyor 36 adapted for connection to a prime mover and which consists of a cylindrical tube 37 and a screw 38 the clearance of which within tube 37 is such as to provide a vapor lock while the screw conveys product to the exterior of freezer 27. The preferred material of construction for screw 38 is a tetrafluoroethylene polymer. Rotary conveyor 36 is inclined upwardly from the level of discharge port 34.

Mounted within coil housing 28 is a refrigeration coil 39 adapted for connection to a refrigeration unit not shown. An upright partition 40 is secured between coil 39 and housing 28. The floor of housing 28 slopes inwardly to form propylene glycol sump 41 which is adapted for connection to a recovery and distribution system which is common to it and a spray tower 42 mounted within housing 28 upstream from coil 39. One or more nozzles 43 are mounted on tower 42 to face toward coil 39.

Coil housing 28 is connected to rotary freezer 27 by conduit 44 in which is mounted fan 45 which is powered by a motor not shown.

As FIG. 2 illustrates, partition 40 is mounted on coil 39 and extends upwardly to housing 28, thereby blocking the passage of gas flowing from conduit 29 which would otherwise pass over coil 39 instead of through it. Gas passing through coil 39 flows through coil housing extension 46 and then through conduit 44.

FIG. 3 shows that product conveyor 35 extends from within compartment 27b to a plane above the first flight of screw 38 within tube 37 of rotary conveyor 36.

As illustrated in FIG. 4, conduit 29 connects crusting chamber 11 with coil housing 28 which has an extension 46 downstream from coil 39.

The portion of crusting chamber 11 above framework 25 is basically the freezer described in U.S. Pat. No. 3,315,480 which is hereby incorporated by reference for a fuller description of the structure of chamber 11, as modified herein. The portion of crusting chamber 11 below framework 25 in conjunction with compartment 27a of freezer 27, functions as a freezing chamber in which the latent heat within the interior sacs of crusted sections is removed. The term "sections" is intended to include slices when used herein.

In operating a freezing apparatus as described above 1,200 pounds per hour of fresh grapefruit sections, for example, are loaded onto shaker 24 from which the sections fall through port 12 into a crusting zone within chamber 11 and are distributed evenly on the upper conveyor belt 14, which in this instance is 32 inches wide and has a load bearing surface 25.5 feet long. liquid nitrogen, at −320°F., is injected into the crusting chamber 11 through jets 18 and sprayed onto the sections at the latter pass beneath jets 18. Blowers 20 and baffles 19 direct the nitrogen, which vaporizes instantaneously upon being sprayed onto the warm (80°F.) sections as the latter are carried, as shown by arrows 49, toward the end of belt 14. Conventional means are employed to activate jets 18 in response to sensor 21 which is set to maintain a temperature from about −30°F. to about −40°F. at the end of the upper portion of chamber 11.

A combination of liquid nitrogen injection and separate mechanical refrigeration of recycled nitrogen vapor in this process requires from about 600 to about 1,300 lbs. of liquid nitrogen per hour and a separate refrigeration capacity of about 160,000 BTU per hour to thoroughly freeze 1,200 lbs. per hour of fruit and to cool it to a temperature from about 0° to −10°F. or lower.

In order to overcome the tendency of the crusted sections to cling to belt 14, roller 15 preferably has a maximum of radius about 2 inches. The flexing action of the belt as it turns on roller 15 dislodges any clinging sections. A high density imperforate polyethylene sheet about 20 mils thick is the material of choice for belt 14.

The residence time on belt 14 is from about 3.9 to about 4.5 minutes. The crusted sections then drop about 18 inches from belt 14 onto belt 16 to be carried through a cooling zone in a direction countercurrent to the flow of gas which is shown by arrows 50 to move from coil housing 28 through conduit 44 and the first compartment 27a of rotary freezer 27 and then through port 13 into crusting chamber 11. Belt 16 is 32 inches wide and 29.75 feet long. Baffles 26 direct the gas onto the sections as the latter are carried toward port 13. The gas temperature as it enters compartment 27a is from about −10°F. to about −20°F. The residence time on belt 16 is from about 4 to about 5 minutes and removal of the heat within the sections is continued as the sections are carried through compartment 27a.

The residence time in compartment 27a is preferably from about 5 to about 6 minutes and not more than about 10 minutes. The sections then fall through chute 30 into the second compartment 27b of the rotary freezer 27 and are carried to discharge port 34 where the frozen product falls onto conveyor 35 which carries the product to transfer box 33. Rotary conveyor 36, which carries the product to a receiver for packaging, is inclined upwardly from the level of discharge port 34 to a plane which is, in this example, about 75 percent of the distance from the level of port 34 to the level of fresh fruit entrance port 12. The clearance between screw 38 and tube 37 is extremely small so that rotary conveyor 36 acts as a vapor lock and the elevated position of the latter causes the flow of the dense vapors of the cold cryogen to be obstructed thus forcing excess gas within the apparatus to be vented through entrance port 12. The slight positive pressure created prevents the ingress of warm and humid atmospheric air at port 12.

Cryogen vapor at about −5° to 0°F., flows through coil 39, which is 4 feet high by 14 feet long and has an open area of about 28 sq. ft. Circumvention of coil 39 by the gas is prevented by partition 40. A solution of propylene glycol in water is sprayed onto coil 39 from nozzles 43 to keep the coil free of ice. Most of the antifreeze solution, which contains about 55 percent propylene glycol, drips into glycol sump 41 but a portion is entrained in the air as the latter passes through coil 39. As the gas passes beyond coil 39 and enters coil housing extension 46, which is 44 inches wide, 85 inches long and 70 inches high, the velocity of the gas stream drops sufficiently to allow the entrained antifreeze droplets to precipitate into sump 41 before the gas stream encounters the fruit in compartment 27a.

In the above example the velocity of the gas as it passes through the restricted space of coil 39 is about 540 feet per minute but the larger cross section presented to the gas by coil housing extension 46 as it continues on its path toward conduit 44 causes the velocity to drop to an average of about 260 feet per minute. At this velocity the entrained propylene glycol solution falls out of the recycle stream. Impingement of the glycol solution on the walls of housing extension 46 may also aid in the removal of substantially all of the glycol solution from the recycle stream.

The process and apparatus described above have been operated without significant interruption for 13 hours continuously and for five 8-hour working shifts in a work week.

The values given above are those for the specific apparatus having the capacity stated. The principles governing the operation of the specific apparatus will, of course, also govern the operation of an apparatus having a different capacity. Therefore, other embodiments and modifications of this invention which come within the spirit of this invention are included within the scope as best defined by the claims.

While the above description illustrates the process and apparatus for a steady state freezing of individual exudatory fruit sections, the invention is also applicable to the freezing of food segments in general. Examples of other foods which may be frozen by this process include peaches, apricots, avocados, papaya, grapes, peas, corn, french fried potatoes, tomatoes, cherries and the like. The segments may be sections, slices, balls, chunks and the like.

Moreover, while applicants do not wish to be limited to any particular mechanism of freezing, it is believed that a multitude of ice crystal nuclei are formed during the crusting step and that the short residence time within the freezing chamber assures the formation of small ice crystals on these nuclei thereby reducing the possibility of damage to the cell walls of the food.

The aggregate product of the inventive process is a totally merchantable product as distinguished from a variable product which must be separated into merchantable grades and rejects. A merchantable product may be obtained throughout the 8 hour operation of this process during a normal working shift.

We claim:

1. A process for steady state freezing of individual food segments which comprises the steps in sequence (1) placing the segments in a crusting zone, (2) vaporizing a liquid cryogen in said zone by spraying the cryogen into the zone and absorbing the latent heat of the surface cells of the segments, (3) directing a rapidly moving stream of a mechanically refrigerated gaseous coolant against the partially frozen food segments to remove the latent heat of the interior cells of said segments, and (4) spraying a liquid cryogen onto the food segments to further cool said segments.

2. The process of claim 1 wherein step 2 is accomplished in from about 3.9 to about 4.5 minutes.

3. The process of claim 1 wherein step 3 is accomplished in less than about 15 minutes.

4. The process of claim 2 wherein step 3 is accomplished in from about 9.0 to about 11 minutes.

5. A process for steady state preparation of frozen fruit segments which comprises the sequential steps of segmenting fresh fruit and (1) placing the segments in a crusting zone, (2) vaporizing a liquid cryogen in said zone by spraying the cryogen into the zone and absorbing the latent heat of the surface cells of the segments, (3) directing a rapidly moving stream of a mechanically refrigerated gaseous coolant against the partially frozen fruit segments to remove the latent heat of the interior cells of said segments, and (4) spraying a liquid cryogen onto the fruit segments to further cool said segments.

6. The process of claim 5 wherein about 20 percent of the heat of the sections is removed in step 2, about 70 percent in step 3 and about 10 percent in step 4.

* * * * *